United States Patent
Wang et al.

(10) Patent No.: US 10,207,725 B2
(45) Date of Patent: Feb. 19, 2019

(54) METHOD AND DEVICE FOR TRANSMITTING SIGNAL AMONG COMPARTMENTS OF TRAIN

(71) Applicant: CRRC QINGDAO SIFANG CO., LTD., Qingdao, Shandong (CN)

(72) Inventors: Miao Wang, Shandong (CN); Jianying Liang, Shandong (CN); Huiqing Zhang, Shandong (CN); Qing Tian, Shandong (CN); Qingjun Han, Shandong (CN); Chanjuan Xiao, Shandong (CN); Mingkun Liu, Shandong (CN); Baoqiang Shan, Shandong (CN); Xiaojie Yu, Shandong (CN)

(73) Assignee: CRRC QINGDAO SIFANG CO., LTD., Qingdao, Shandong (CN)

( * ) Notice: Subject to any disclaimer, the term of this patent is extended or adjusted under 35 U.S.C. 154(b) by 72 days.

(21) Appl. No.: 15/119,952

(22) PCT Filed: Oct. 27, 2015

(86) PCT No.: PCT/CN2015/092953
§ 371 (c)(1),
(2) Date: Aug. 18, 2016

(87) PCT Pub. No.: WO2016/082643
PCT Pub. Date: Jun. 2, 2016

(65) Prior Publication Data
US 2017/0057525 A1  Mar. 2, 2017

(30) Foreign Application Priority Data
Nov. 24, 2014 (CN) .......................... 2014 1 0682075

(51) Int. Cl.
*B61L 15/00* (2006.01)
*H04L 29/00* (2006.01)
(Continued)

(52) U.S. Cl.
CPC ......... *B61L 15/0018* (2013.01); *B60L 3/0092* (2013.01); *B60L 15/32* (2013.01);
(Continued)

(58) Field of Classification Search
CPC .................................................. B61L 15/0018
(Continued)

(56) References Cited

U.S. PATENT DOCUMENTS 6,922,619 B2    7/2005  Baig et al.
8,607,122 B2 *  12/2013 Resch ................. G06F 11/1076
                                                714/763
(Continued)

FOREIGN PATENT DOCUMENTS

CN    101730639 A       6/2010
CN    10808028 A    *   8/2010      ............. H04L 29/06
(Continued)

OTHER PUBLICATIONS

International Search Report for PCT/CN2015/092953, dated Jan. 25, 2016, ISA/CN.

*Primary Examiner* — Khalil Naghdali
(74) *Attorney, Agent, or Firm* — U.S. Fairsky LLP; Yue (Robert) Xu

(57) ABSTRACT

A method and a device for transmitting signals among compartments of a train are provided. The method comprises: receiving a first signal transmitted via a jumper cable, and extracting first data carried in the first signal; receiving a second signal transmitted wirelessly corresponding to the first signal, and extracting second data carried in the second signal; and determining whether the first data is identical (Continued)

with the second data, and outputting the first signal in a case that it is determined that the first data is identical with the second data, or outputting the second signal in a case that it is determined that the first data is not identical with the second data. The method and the device improve the reliability of transmission of signals among compartments of a train.

6 Claims, 4 Drawing Sheets

(51) Int. Cl.
    *B60L 3/00*     (2006.01)
    *B60L 15/32*     (2006.01)
    *B60L 15/42*     (2006.01)
    *H04L 9/32*     (2006.01)
    *H04W 12/10*     (2009.01)
    *H04L 29/06*     (2006.01)
    *H04L 29/08*     (2006.01)
    *H04L 29/14*     (2006.01)
    *B60L 15/00*     (2006.01)

(52) U.S. Cl.
    CPC ........... *B60L 15/42* (2013.01); *B61L 15/0036* (2013.01); *B61L 15/0072* (2013.01); *B61L 15/0081* (2013.01); *H04L 9/3226* (2013.01); *H04L 29/00* (2013.01); *H04L 63/0428* (2013.01); *H04L 63/12* (2013.01); *H04L 63/18* (2013.01); *H04L 67/12* (2013.01); *H04L 69/40* (2013.01); *H04W 12/10* (2013.01); *B60L 15/00* (2013.01); *B60L 2200/26* (2013.01); *H04L 2209/80* (2013.01); *H04L 2209/84* (2013.01)

(58) Field of Classification Search
    USPC .......................................................... 380/270
    See application file for complete search history.

(56) References Cited

U.S. PATENT DOCUMENTS

| | | |
|---|---|---|
| 2008/0306640 A1 | 12/2008 | Rosenthal |
| 2010/0241295 A1 | 9/2010 | Cooper |
| 2011/0093144 A1* | 4/2011 | Goodermuth ......... B60T 13/665 701/20 |
| 2011/0270475 A1* | 11/2011 | Brand ................. B61L 15/0027 701/20 |
| 2012/0136515 A1* | 5/2012 | Noffsinger .......... B61L 15/0027 701/19 |
| 2012/0316764 A1* | 12/2012 | Kraeling ............. B61L 15/0036 701/117 |
| 2012/0317282 A1* | 12/2012 | Kraeling ................. H04L 12/40 709/224 |

FOREIGN PATENT DOCUMENTS

| | | |
|---|---|---|
| CN | 101841448 A | 9/2010 |
| CN | 104580356 A | 4/2015 |
| EP | 1403162 B1 | 2/2005 |

* cited by examiner

METHOD AND DEVICE FOR TRANSMITTING SIGNAL AMONG COMPARTMENTS OF TRAIN

This application is the national phase of International Application No. PCT/CN2015/092953, filed on Oct. 27, 2015, which claims the priority to Chinese Patent Application No. 201410682075.2 titled "METHOD AND DEVICE FOR TRANSMITTING SIGNAL AMONG COMPARTMENTS OF TRAIN", filed with the Chinese State Intellectual Property Office on Nov. 24, 2014, both of which are incorporated herein by reference in their entireties.

FIELD

The present disclosure relates to the field of rail train technology, and particularly to a method and a device for transmitting a signal among compartments of a train.

BACKGROUND

Currently, a rail transit vehicle currently is a multi-marshalling vehicle. In a traditional situation, a signal among compartments of a train is transmitted via a jumper cable. In a case that a fatigue break fault occurs in a jumper cable among the compartments of the train, it is unable to transmit some key signals. In some special cases, the fatigue break fault of the jumper cable is concealed and is difficult to be troubleshot. Even a basic function such as train traction, braking, opening a door and closing the door can not be realized in a case of a serious fault, which seriously affects a normal operation of the train. Reliability of transmitting the signal among compartments of the train is low.

SUMMARY

A method and a device for transmitting a signal among compartments of a train are provided in the present disclosure, to improve the reliability of transmitting the signal among compartments of the train.

In a first aspect, a method for transmitting a signal among compartments of a train is provided, which includes:

S1: receiving a first signal transmitted via a jumper cable, and extracting first data carried in the first signal;

S2: receiving a second signal transmitted wirelessly corresponding to the first signal, and extracting second data carried in the second signal; and S3: determining whether the first data is identical with the second data, and outputting the first signal in a case that it is determined that the first data is identical with the second data, or outputting the second signal in a case that it is determined that the first data is not identical with the second data.

Further, the S3 further includes:

determining a fault of the jumper cable and outputting information on the fault of the jumper cable in a case that it is determined that the first data is not identical with the second data.

Further, the S2 further includes:

receiving an encrypted second signal, where a data packet in the encrypted second signal includes a physical address of a device for transmitting the wireless signal;

determining a decryption password based on preset correspondences between physical addresses and passwords and the physical address of the device for transmitting the wireless signal; and decrypting the encrypted second signal based on the decryption password.

In a second aspect, a method for transmitting a signal among compartments of a train is provided according to the present disclosure, which includes:

A1: receiving an original signal transmitted via an on-train signal line;

A2: converting the original signal into a first signal transmitted via a jumper cable and a second signal transmitted wirelessly;

A3: transmitting the first signal via the jumper cable; and

A4: transmitting the second signal wirelessly.

Further, before the A4, the method further includes: encrypting the second signal, and a data packet of the encrypted second signal includes a physical address of a device for transmitting the second signal.

In a third aspect, a device for transmitting a signal among compartments of a train is provided, which includes:

a first receiving unit configured to receive a first signal transmitted via a jumper cable, and extract first data carried in the first signal;

a second receiving unit configured to receive a second signal transmitted wirelessly corresponding to the first signal, and extract second data carried in the second signal; and a determining unit configured to determine whether the first data is identical with the second data, and output the first signal in a case that it is determined that the first data is identical with the second data, or output the second signal in a case that it is determined that the first data is not identical with the second data.

Further, the determining unit is further configured to determine a fault of the jumper cable and output information on the fault of the jumper cable in a case that it is determined that the first data is not identical with the second data.

Further, the second receiving unit further includes:

a receiving sub unit configured to receive an encrypted second signal, where a data packet in the encrypted second signal includes a physical address of a device for transmitting the wireless signal;

a password determining sub unit configured to determine a decryption password based on preset correspondences between physical addresses and passwords and the physical address of the device for transmitting the wireless signal; and a decrypting sub unit configured to decrypt the encrypted second signal based on the decryption password.

In a fourth aspect, a device for transmitting a signal among compartments of a train is provided according to the present disclosure, which includes:

a receiving unit configured to receive an original signal transmitted via an on-train signal line;

a converting unit configured to convert the original signal into a first signal transmitted via a jumper cable and a second signal transmitted wirelessly;

a first transmitting unit configured to transmit the first signal via the jumper cable; and a second transmitting unit configured to transmit the second signal wirelessly.

Further, the device further includes an encrypting unit configured to encrypt the second signal, and a data packet of the encrypted second signal includes a physical address of a device for transmitting the second signal.

In the method and the device for transmitting the signal among compartments of the train according to the present disclosure, the signal among compartments is transmitted in both a wire mode and a wireless mode, and it is detected whether a fault occurs in the jumper cable, the signal among compartments transmitted wirelessly is outputted in a case that the fault occurs in the jumper cable, thereby improving the reliability of transmitting the signal among compartments of the train.

BRIEF DESCRIPTION OF THE DRAWINGS

The drawings to be used in the description of the embodiments of the present disclosure or the conventional technology are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

DETAILED DESCRIPTION OF THE EMBODIMENTS

In order that the objectives, technical solutions and advantages of the present disclosure can be clearer, the technical solutions according to the embodiments of the present disclosure are described clearly and completely as follows in conjunction with the drawings in the embodiments of the present disclosure. It is apparent that the described embodiments are only a few rather than all of the embodiments according to the present disclosure. Any other embodiments obtained by those skilled in the art based on the embodiments in the present disclosure without any creative work fall within the protection scope of the present disclosure.

Figure 1:
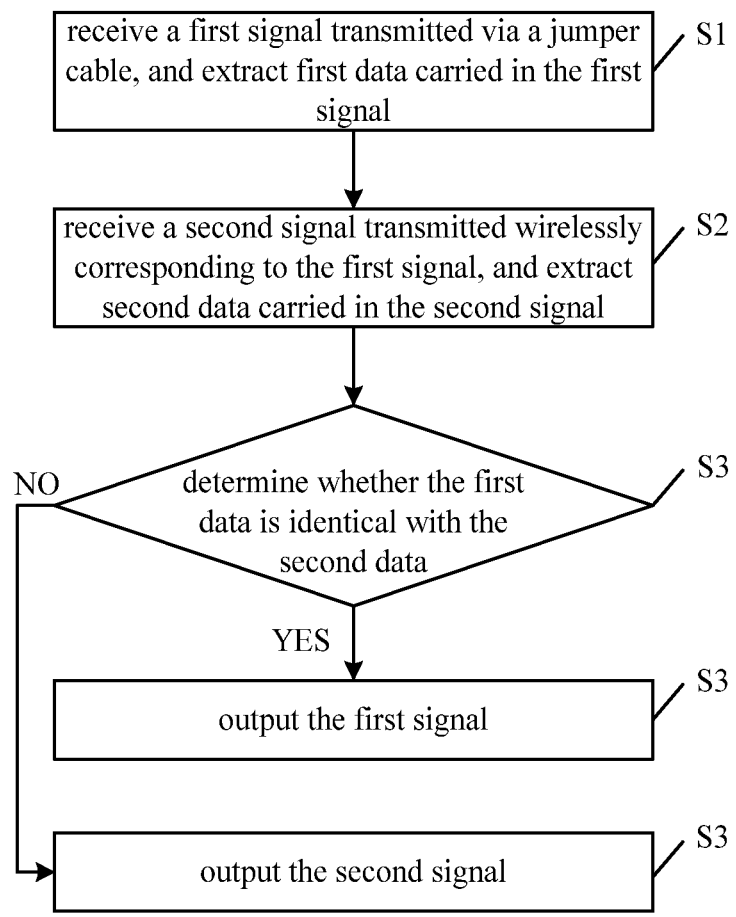
FIG. 1 is a flow diagram of a method for transmitting a signal among compartments of a train according to an embodiment of the present disclosure.

A method for transmitting a signal among compartments of a train is provided according to an embodiment of the present disclosure. With reference to FIG. 1, the method includes S1 to S3.

In S1, a first signal transmitted via a jumper cable is received, and first data carried in the first signal is extracted.

In S2, a second signal transmitted wirelessly corresponding to the first signal is received, and second data carried in the second signal is extracted.

In S3, it is determined whether the first data is identical with the second data, and the first signal is outputted in a case that it is determined that the first data is identical with the second data, or the second signal is outputted in a case that it is determined that the first data is not identical with the second data.

In the method for transmitting the signal among compartments of the train according to the embodiment of the present disclosure, the signal among compartments is transmitted in both a wire mode and a wireless mode, and it is detected whether a fault occurs in the jumper cable, the signal among compartments transmitted wirelessly is outputted in a case that the fault occurs in the jumper cable, thereby improving the reliability of transmitting the signal among compartments of the train.

In order to maintain the jumper cable in which the fault occurs as soon as possible, the information on the fault of the jumper cable is transmitted to a train network system upon detecting the fault of the jumper cable, to convenient for a maintainer to know the information on the fault of the jumper cable. The S3 further includes: determining the fault of the jumper cable and outputting the information on the fault of the jumper cable in a case that it is determined that the first data is not identical with the second data.

In addition, in order to prevent misjudgment, a same signal is transmitted several times to confirm the fault in a case that the fault of the jumper cable is determined.

In order to prevent other signals from interfering with the second signal transmitted wirelessly and guarantee safety of the second signal, the second signal is encrypted before transmitting the second signal, and a device for receiving the second signal is configured to decrypt the encrypted second signal upon receiving the encrypted second signal. The S2 further includes:

receiving the encrypted second signal, where a data packet in the encrypted second signal includes a physical address of the device for transmitting the wireless signal;

determining a decryption password based on preset correspondences between physical addresses and passwords and the physical address of the device for transmitting the wireless signal; and decrypting the encrypted second signal based on the decryption password.

Figure 2:
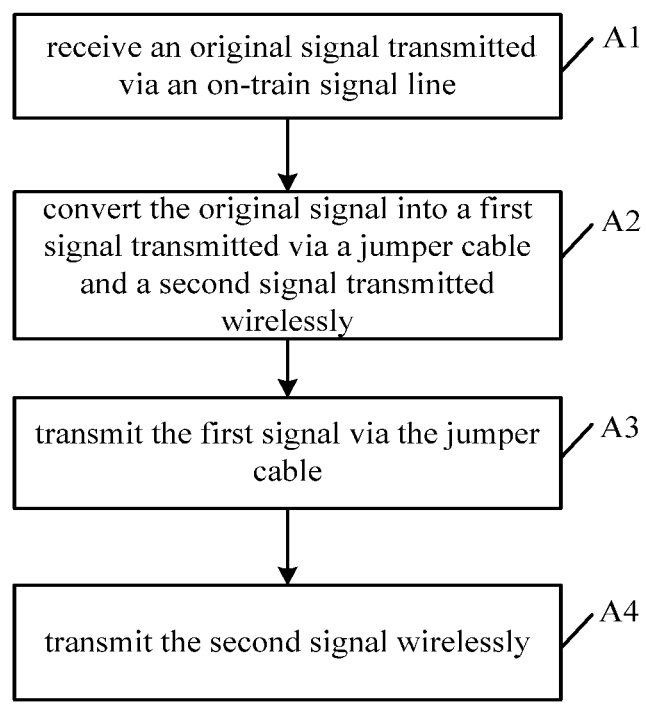
FIG. 2 is a flow diagram of a method for transmitting a signal among compartments of a train according to an embodiment of the present disclosure.

FIG. 2 shows a method for transmitting a signal among compartments of a train according to an embodiment of the present disclosure; the method includes A1 to A4.

In A1, an original signal transmitted via an on-train signal line is received.

In A2, the original signal is converted into a first signal transmitted via a jumper cable and a second signal transmitted wirelessly.

In A3, the first signal is transmitted via the jumper cable.

In A4, the second signal is transmitted wirelessly.

In order to prevent other signals from interfering with the second signal transmitted wirelessly and guarantee safety of the second signal, the second signal is encrypted before transmitting the second signal. Before the A4, the method further includes encrypting the second signal. A data packet in the encrypted second signal includes a physical address of a device for transmitting the second signal.

Figure 3:
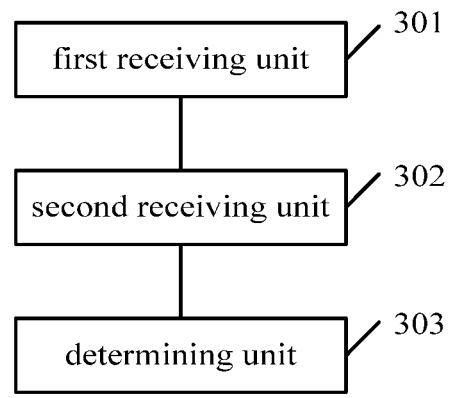
FIG. 3 is a schematic structural diagram of a device for transmitting a signal among compartments of a train according to an embodiment of the present disclosure.

With reference to FIG. 3, a device for transmitting a signal among compartments of a train is provided according to an embodiment, and the device includes a first receiving unit 301, a second receiving unit 302 and a determining unit 303.

The first receiving unit 301 is configured to receive a first signal transmitted via a jumper cable, and extract first data carried in the first signal.

The second receiving unit 302 is configured to receive a second signal transmitted wirelessly corresponding to the first signal, and extract second data carried in the second signal.

The determining unit 303 is configured to determine whether the first data is identical with the second data, and output the first signal in a case that it is determined that the first data is identical with the second data, or output the second signal in a case that it is determined that the first data is not identical with the second data.

In order to maintain the jumper cable in which a fault occurs as soon as possible, information on the fault of the jumper cable is transmitted to a train network system upon detecting the fault of the jumper cable, to convenient for a maintainer to know the information on the fault of the jumper cable. The determining unit is further configured to determine the fault of the jumper cable and output the information on the fault of the jumper cable in a case that it is determined that the first data is not identical with the second data.

In order to prevent other signals from interfering with the second signal transmitted wirelessly and guarantee safety of the second signal, the second signal is encrypted before the transmitting second signal, and a device for receiving the second signal is configured to decrypt the encrypted second signal upon receiving the encrypted second signal. The second receiving unit further includes: a receiving sub unit, a password determining sub unit and a decrypting sub unit.

The receiving sub unit is configured to receive the encrypted second signal, and a data packet in the encrypted second signal includes a physical address of the device for transmitting the wireless signal.

The password determining sub unit is configured to determine a decryption password based on preset correspondences between physical addresses and passwords and the physical address of the device for transmitting the wireless signal.

The decrypting sub unit is configured to decrypt the encrypted second signal based on the decryption password.

The preset correspondences between the physical addresses and the passwords described above may be stored in the device for transmitting the signal among compartments of the train in advance.

Figure 4:
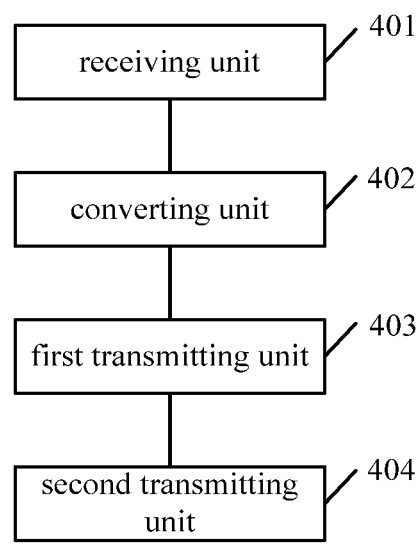
FIG. 4 is a schematic structural diagram of a device for transmitting a signal among compartments of a train according to an embodiment of the present disclosure.

FIG. 4 shows a device for transmitting a signal among compartments of a train according to an embodiment. The device includes a receiving unit 401, a converting unit 402, a first transmitting unit 403 and a second transmitting unit 404.

The receiving unit 401 is configured to receive an original signal transmitted via an on-train signal line.

The converting unit 402 is configured to convert the original signal into a first signal transmitted via a jumper cable and a second signal transmitted wirelessly.

The first transmitting unit 403 is configured to transmit the first signal via the jumper cable.

The second transmitting unit 404 is configured to transmit the second signal transmitted wirelessly.

In a possible implementation, the device further includes an encrypting unit.

The encrypting unit is configured to encrypt the second signal, and a data packet in the encrypted second signal includes a physical address of a device for transmitting the second signal.

The physical address in the embodiment is unique.

The data packet in the encrypted second signal described above may further include a password, a sequence number of the data packet, a byte length of the data packet, data transmitted among compartments of a train and a CRC checksum value of the data packet.

Figure 5:
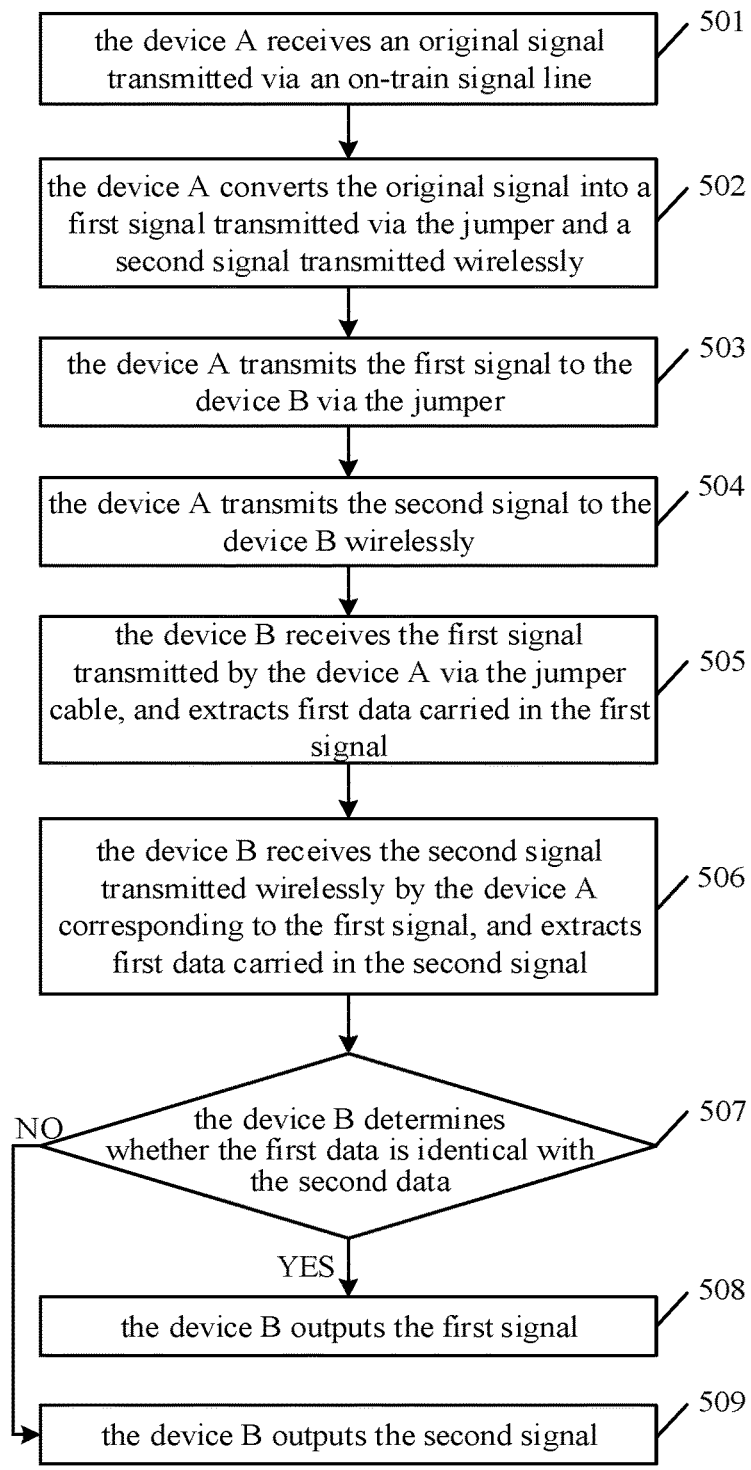
FIG. 5 is a flow diagram of a method for transmitting a signal among compartments of a train according to an embodiment of the present disclosure.

The method for transmitting the signal among compartments of the train according to the present disclosure is illustrated hereinafter with a specific implementation. In the implementation, there are two devices for transmitting the signal among compartments of the train, that is, a device A and a device B. The device A and the device B are located in two adjacent vehicles, respectively. Each of the device A and the device B has a unique physical address by arranging a physical connection wire between the device A and the device B. The device A is connected with the device B via a jumper cable. The device A is the device for transmitting the signal among compartments of the train shown in FIG. 4, and the device B is the device for transmitting the signal among compartments of the train shown in FIG. 3. With reference to FIG. 5, the method includes step 501 to step 509.

In step 501, the device A receives an original signal transmitted via an on-train signal line.

In step 502, the device A converts the original signal into a first signal transmitted via the jumper cable and a second signal transmitted wirelessly.

In step 503, the device A transmits the first signal to the device B via the jumper cable.

In step 504, the device A transmits the second signal to the device B wirelessly.

In step 505, the device B receives the first signal transmitted by the device A via the jumper cable, and extracts first data carried in the first signal.

In step 506, the device B receives the second signal transmitted wirelessly by the device A corresponding to the first signal, and extracts second data carried in the second signal.

In step 507, the device B determines whether the first data is identical with the second data, and step 508 is performed in a case that it is determined that the first data is identical with the second data, or step 509 is performed in a case that it is determined that the first data is not identical with the second data.

In step 508, the device B outputs the first signal.

In step 509, the device B outputs the second signal.

In the embodiment, the signal outputted from the device B can also be continued to be transmitted via the on-train signal line.

In the method and the device for transmitting the signal among compartments of the train according to the embodiments of the present disclosure, a signal of the train can still be transmitted from a vehicle to another vehicle wirelessly in a case that the jumper cable breaks, thereby minimizing an influence of the broken jumper cable on the train. Also, the jumper cable is detected, and information on a fault of the jumper cable is transmitted to a display interface of a monitor system via a train network, to prompt a driver and a maintainer.

Since that contents such as an information interaction process and an execution process between all units or sub units within the device described above are based on a same concept as that of the method embodiment of the present disclosure, reference can be made to description in the method embodiment of the present disclosure, and the contents are not described repeatedly any more.

It should also be illustrated that a relation term such as "the first" and "the second" herein is only used to distinguish one entity or operation from another entity or operation, and does not necessarily require or imply that there is an actual relation or sequence between these entities or operations. Furthermore, terms "include", "comprise" or any other variations are intended to cover non-exclusive "include", so that a process, a method, an object or an equipment including a series of factors not only include the series of factors, but also include other factors not explicitly listed, or also include inherent factors of the process, the method, the object or the equipment. Without more limitation, a factor defined in a sentence "include one . . . " does not exclude a case that there is also another same factor in the process, the method, the object or the equipment including the described factor.

Those skilled in the art should understand that all of or a part of steps of the above method embodiments may be performed by instructing corresponding hardware through a program. The proceeding program may be stored in a computer readable storage medium. When being executed, the program performs the steps of the above method embodiments. The proceeding storage medium includes various mediums capable of storing program codes, such as a ROM, an RAM, a magnetic disc or an optic disc.

Finally, it should be noted that, the foregoing are only preferred embodiments of the present disclosure and therefore are only intended to illustrate the technical solutions of the present disclosure and not limit the protection scope of the present disclosure. Any modification, equivalent substitution and improvement made within the spirit and principle of the present disclosure fall within the scope of the present disclosure.

The invention claimed is:

1. A method for transmitting a signal among compartments of a train, comprising:
    S1: receiving a first signal transmitted via a jumper cable, and extracting first data carried in the first signal;
    S2: receiving a second signal transmitted wirelessly corresponding to the first signal, and extracting second data carried in the second signal; and
    S3: determining that the first data is identical with the second data, determining no fault of the jumper cable and outputting the first signal; or, determining that the first data is not identical with the second data, determining a fault of the jumper cable and outputting the second signal;
    wherein the S2 further comprises:
    receiving an encrypted second signal wherein a data packet in the encrypted second signal comprises a physical address of a device for transmitting the wireless signal;
    determining a decryption password based on preset correspondences between physical addresses and passwords and the physical address of the device for transmitting the wireless signal; and
    decrypting the encrypted second signal based on the decryption password;
    wherein a same signal is transmitted several times to confirm the fault of the jumper cable in a case that the fault of the jumper cable is determined.

2. The method according to claim 1, wherein the S3 further comprises:
    determining a fault of the jumper cable and outputting information on the fault of the jumper cable in a case that it is determined that the first data is not identical with the second data.

3. A method for transmitting a signal among compartments of a train, comprising:
    A1: receiving an original signal transmitted via an on-train signal line;
    A2: converting the original signal into a first signal transmitted via a jumper cable and a second signal transmitted wirelessly;
    A3: transmitting the first signal via the jumper cable; and
    A4: transmitting the second signal wirelessly;
    wherein, before the A4, the method further comprises:
    encrypting the second signal, wherein a data packet of the encrypted second signal comprises a physical address of a device for transmitting the second signal;
    wherein a same signal is transmitted several times to confirm a fault of the jumper cable in a case that the fault of the jumper cable is determined.

4. A device for transmitting a signal among compartments of a train, comprising a processor and a computer readable storage medium storing program codes, wherein the processor performs the stored program codes to:
    receive a first signal transmitted via a jumper cable, and extract first data carried in the first signal;
    receive a second signal transmitted wirelessly corresponding to the first signal, and extract second data carried in the second signal; and
    determine that the first data is identical with the second data, determine no fault of the jumper cable and output the first signal; or, determine that the first data is not identical with the second data, determine a fault of the jumper cable and output the second signal;
    wherein the processor further performs the stored program codes to:
    receive an encrypted second signal, wherein a data packet in the encrypted second signal comprises a physical address of a device for transmitting the wireless signal;
    determine a decryption password based on preset correspondences between physical addresses and passwords and the physical address of the device for transmitting the wireless signal: and
    decrypt the encrypted second signal based on the decryption password;
    wherein a same signal is transmitted several times to confirm the fault of the jumper cable in a case that the fault of the jumper cable is determined.

5. The device according to claim 4, wherein the processor further performs the stored program codes to determine a fault of the jumper cable and output information on the fault of the jumper cable in a case that it is determined that the first data is not identical with the second data.

6. A device for transmitting a signal among compartments of a train, comprising a processor and a computer readable storage medium storing program codes, wherein the processor performs the stored program codes to:
    receive an original signal transmitted via an on-train signal line;
    convert the original signal into a first signal transmitted via a jumper cable and a second signal transmitted wirelessly;
    transmit the first signal via the jumper cable; and
    transmit the second signal wirelessly;
    wherein the processor further-performs the stored program codes to:
    encrypt the second signal, wherein a data packet of the encrypted second signal comprises a physical address of a device for transmitting the second signal;
    wherein a same signal is transmitted several times to confirm a fault of the jumper cable in a case that the fault of the jumper cable is determined.

* * * * *